United States Patent
Avenel (12)

(10) Patent No.: US 6,483,425 B1
(45) Date of Patent: Nov. 19, 2002

(54) SYSTEM FOR ENHANCING THE SECURITY OF A BI-DIRECTIONAL DATA TRANSMISSION SYSTEM CONTROLLING ACCESS TO AN ENCLOSED SPACE, NOTABLY A VEHICLE

(75) Inventor: Jean-Jacques Avenel, Chennevieres/Marne (FR)

(73) Assignee: Valeo Securite Habitacle, Creteil (FR)

(*) Notice: Subject to any disclaimer, the term of this patent is extended or adjusted under 35 U.S.C. 154(b) by 0 days.

(21) Appl. No.: 09/439,538

(22) Filed: Nov. 12, 1999

(30) Foreign Application Priority Data

Nov. 13, 1998 (FR) .............................. 98 14261

(51) Int. Cl.$^7$ ................................. G07D 7/00
(52) U.S. Cl. ..................... 340/5.61; 340/5.62; 340/5.1; 340/5.2; 455/41
(58) Field of Search ............... 340/5.61, 5.62, 340/5.1, 5.2, 5.8, 426, 5.7, 5.71, 5.72, 5.73, 10.2; 455/41

(56) References Cited

U.S. PATENT DOCUMENTS

| | | |
|---|---|---|
| 4,484,183 A | 11/1984 | Morey |
| 5,309,144 A | 5/1994 | Lacombe et al. |
| 5,723,911 A | 3/1998 | Glehr |

FOREIGN PATENT DOCUMENTS

| | | |
|---|---|---|
| DE | 44 09 167 | 6/1995 |
| FR | 2 664 064 | 1/1992 |

OTHER PUBLICATIONS

French Search Report dated Aug. 10, 1999.

*Primary Examiner*—Julie Lieu
(74) *Attorney, Agent, or Firm*—Morgan & Finnegan, LLP

(57) ABSTRACT

The disclosure relates to a system providing enhanced security of a bi-directional data transmission controlling access to an enclosed space, including an identification device with a transmitting circuit and a receiving circuit installed in said enclosed space, and an identifier carried by a user wishing to gain access, a data interchange between said identification device and said identifier normally being established when the distance between them is less than a predetermined limit, the access being granted only when said identification device has authenticated said identifier, wherein, to prevent an interchange of identification data at a distance greater than said predetermined limit, notably by interposing an unauthorized repeater, the system includes means of switching that establish a momentary loopback of said transmitting circuit of said identification device, via a return circuit of said identifier, and said identification device includes means of measuring the resonance frequency of the oscillation generated by such a loopback, and means of control able to measure the difference between said resonance frequency and a reference frequency, so as to maintain access interdiction when this difference exceeds a predetermined value. The invention is notably applicable to secure control of access to a vehicle.

11 Claims, 1 Drawing Sheet

SYSTEM FOR ENHANCING THE SECURITY OF A BI-DIRECTIONAL DATA TRANSMISSION SYSTEM CONTROLLING ACCESS TO AN ENCLOSED SPACE, NOTABLY A VEHICLE

BACKGROUND OF THE INVENTION

The invention relates to a system for enhancing the security of a bi-directional data transmission used to control access to an enclosed space, of the type including an identification device, with a transmitting circuit and a receiving circuit, installed in the enclosed space, and an identifier carried by a user who wishes to gain access. A data interchange is established between the identification device and the identifier to confirm the identity of the user. This interchange is normally established when the distance between the identifier and the identification device is less than a predetermined limit, access being granted only when the identification device authenticates the identifier.

The invention has many potential applications, and appears to be particularly suitable for a system of enhanced access security to an automobile vehicle whose openings, notably the doors of the passenger compartment, include locks controlled by the access system.

DESCRIPTION OF THE PRIOR ART

In this type of system, to gain access the user must first start an identification operation. This operation can be triggered, for example, by pressing a control button on the access door, or by a remote control, or possibly by a presence sensor installed in the enclosed space.

Generally, this start of the identification operation necessitates that the user be in close proximity to the enclosed space to which he requires access.

The identification operation makes use of a data interchange between the identification device and the identifier constituted, for example, by a badge containing an electromagnetic transponder. When the operation is triggered, the identification device installed in the enclosed space generally emits an interrogation signal to activate the identifier which then returns a coded signal analyzed by the identification device. If the coded signal corresponds to the authorized code, the identification device grants access, for example by unlocking one or more locks. The signals interchanged are generally electromagnetic signals.

To improve the security, the system is designed to provide only a short transmission range such that an interchange of identification data between the identification device and identifier can normally be established only when the distance between the enclosed space and the identifier is less than a predetermined limit, for example a few tens of meters.

Despite these precautions, such an access system runs the risk of being pirated by another transmission-reception system interposed in the link between the identification device and the identifier, this pirate transmission-reception serving in fact only as a repeater.

For example, two pirates acting together could fraudulently gain access to the enclosed space as follows. A first pirate, equipped with a transmission-reception system installed for example in a bag approaches a vehicle closed by the authorized user who then walks away. The second pirate, equipped with a transmission-reception system similar that of his accomplice follows the user carrying the identifier. When the authorized user is sufficiently far away, the first pirate starts the identification operation, for example by pressing a control button on the door of the vehicle. The signals emitted by the identification device are relayed by the transmission-reception system of the first pirate to the system of the second pirate, that repeats the signals of the identification device to the identifier. Unknown to the authorized user, his identifier responds by emitting the authorized code which is relayed by the repeater system back to the identification device which then unlocks of the door thereby giving access to the first pirate.

SUMMARY OF THE INVENTION

The purpose of the invention is above all to provide a system that enhances the security of a bi-directional data transmission used to control access to an enclosed space, by preventing any violation by a pirate transmission-reception system such as described previously. The security system proposed is also reliable, easy to use, practical and inexpensive.

More precisely, the invention is a system providing enhanced security of a bi-directional data transmission controlling access to an enclosed space, notably access to a vehicle, including an identification device with a transmitting circuit and a receiving circuit installed in said enclosed space, and an identifier carried by a user wishing to gain access, a data interchange between said identification device and said identifier normally being established when the distance between them is less than a predetermined limit, the access being granted only when said identification device has authenticated said identifier, wherein, to prevent an interchange of identification data at a distance greater than said predetermined limit, notably by interposing an unauthorized repeater, the system includes means of switching that establish a momentary loopback of the transmitting circuit of the identification device, via a return circuit of said identifier, and said identification device includes means of measuring the resonance frequency of the oscillation generated by such a loopback, and means of control able to measure the difference between said resonance frequency and a reference frequency, so as to maintain access interdiction when this difference exceeds a predetermined value.

According to the invention, an oscillator is made between the identification device and the identifier. If a parasitic system, such as a repeater system, is interposed in the feedback loop the resonance frequency is modified; detection of this modification then enables the interdiction of access to be maintained.

Means of switching preferably establish, during an identification request, the momentary loopback of the transmitting circuit of the identification device, via a return circuit of the identifier, after the identification request has been authenticated by the identifier.

In a first embodiment, the identification device includes a receiving circuit with a radiofrequency (RF) receiver and a management unit with a frequency counter, and a transmitting circuit with a low frequency (LF) generator, an amplifier, and a switch able to connect the output of the RF receiver directly to the input of the amplifier, in order to establish the loopback, whereas in normal operation the input of this amplifier is connected to the output of the LF generator.

The identifier includes a LF receiver, notably with automatic gain control (AGC), a data decoding circuit, a management unit, an RF transmitter, and a switch able to connect the output of the LF receiver directly to the input of the RF transmitter, in order to establish the loopback, whereas in normal operation the input of the RF transmitter is connected to the management unit.

The momentary loopback is advantageously triggered by the emission of an initialization signal by the RF transmitter of the identifier, this signal initializing the counter of the management unit of the identification device.

The reference frequency with which the measured resonance frequency is compared is advantageously constituted by a value initially memorized which is learned by the system.

The LF transmitting circuit of the identification device is thereby looped back momentarily with the high frequency (RF) return circuit of the badge or identifier.

The LF communication frequency of the identification device to the identifier can be 125 kHz, and the transmitting and receiving antennas are tuned to this frequency, which obliges the system to oscillate around this frequency if the return channel is assumed to be linear and without phase shift at this frequency.

The return channel operates advantageously at radiofrequency, 434 MHz or other. The most suitable modulation for the return signal would appear to be frequency modulation to optimize the linearity. The RF transmission-reception system should preferably have a modulation band of at least 150 kHz.

The frequencies mentioned previously obviously constitute only one particular embodiment, since the system can operate at different frequencies.

In another simplified variant, the system is designed to transmit and receive signals of logical "all or nothing" type and to operate in "on/off" amplitude modulation.

The identification device includes an oscillator whose output is connected to a transmitting circuit and whose input is connected to a switch able to connect the output of a RF receiver directly to the input of the oscillator, in order to establish the loopback, whereas in normal operation the input of this oscillator is connected to the output of an operational amplifier whose non-inverter input is connected to ground via a resistor, and the inverter input is connected to ground via a capacitor, these two inputs being connected respectively via a resistor to the output of the RF receiver.

The identifier includes an envelope detector circuit whose input is connected to a LF receiving circuit and whose output is connected to a data decoding circuit and a management unit, and also to a switch able to connect the output of the envelope detector circuit directly to the input of a RF transmitter, in order to establish the loopback, whereas in normal operation the input of the RF transmitter is connected to the management unit.

The whole transmission-reception loop has a transit time which, associated with the time constant RC, where R and C are the respective values of the resistor and the capacitor connected to the inverter input of the operational amplifier, results in an oscillation at a specific frequency.

If relay transmitters (repeaters) are introduced in the loop, the transit time in the feedback loop will increase, lowering the oscillation frequency in proportion to the parasitic time delay introduced.

Therefore if the oscillation frequency of the system is measured, this can serve as a reference during each interrogation of the identifier.

To exit this oscillatory mode, it is sufficient to break the oscillation loop at the identifier, for example by the switch provided between the envelope detector and the RF transmitter, or in the identification device.

BRIEF DESCRIPTION OF THE DRAWINGS

Other characteristics and advantages of the invention will become evident on reading the description below of embodiments, which are non-limitative and taken only as examples, with reference to the attached drawings of which.

DETAILED DESCRIPTION

Figure 1:
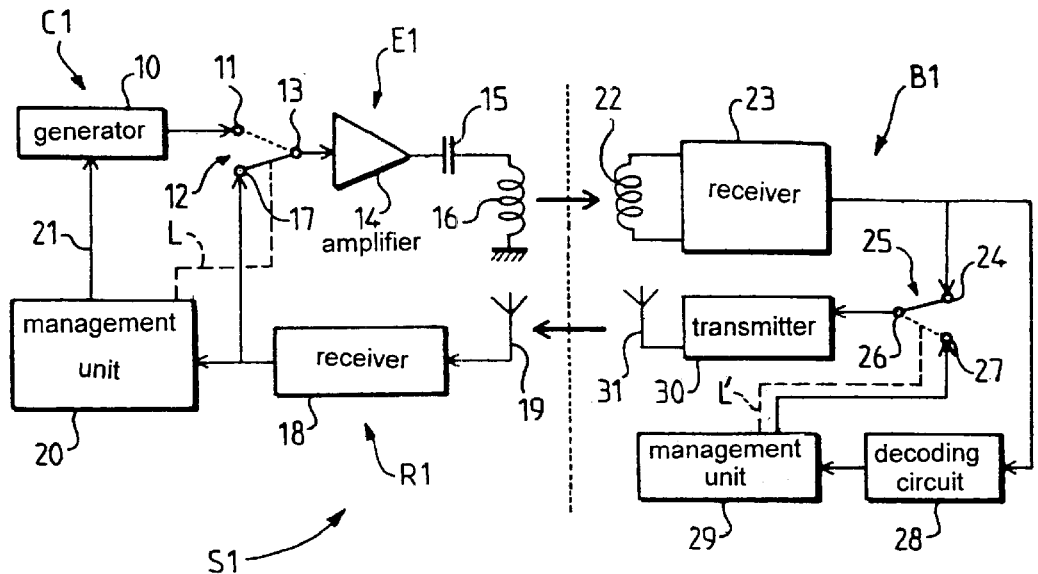
FIG. 1 is a block diagram of a first embodiment of a system according to the invention providing secure access to an enclosed space, in particular a vehicle.

FIG. 1 shows a diagram of an system S1 for enhancing access security to a vehicle.

This system S1 includes an identification device C1 with a transmitting circuit E1 and a receiving circuit R1. The device C1 is installed in the vehicle.

The system S1 also includes an identifier constituted by a badge B1 carried by a user wishing to gain access to the vehicle.

The transmitting circuit El includes a LF generator 10 whose output is connected to one terminal 11 of a two-way switch 12 with a common terminal 13 connected to the input of an amplifier 14. The output of this amplifier 14 is connected to an oscillator circuit constituted by a capacitor 15 and an inductance 16 in series, one terminal of the inductance 16 being connected to ground. The other terminal 17 of the switch 12 is connected to the output of a radiofrequency receiver 18 whose input is connected to the output of an antenna 19.

The receiver 18 is preferably of frequency demodulation type.

The output of the receiver 18 is also connected to a management unit 20 with counter of the oscillation frequency produced. The management unit 20 includes a control output connected via a link 21 to the generator 10. Another output of the unit 20 provides control of the switch 12, via a link L.

This switch 12 can take two positions: a first position shown as a solid line in FIG. 1, in which terminal 13 is connected to terminal 17, and a second position, shown as a dotted line, in which terminal 13 is connected to terminal 11.

The identifier or badge B1 includes an inductance 22 whose terminals are connected to a LF receiver 23, preferably with automatic gain control (AGC). The output of the receiver 23 is connected to a terminal 24 of a two-way switch 25 that has a common terminal 26 and another terminal 27.

This switch 25 can take two positions: a first position shown as a solid line in FIG. 1, in which terminal 26 is connected to terminal 24, and a second position, shown as a dotted line, in which terminal 26 is connected to terminal 27.

The output of the receiver 23 is also connected to an input of a data decoding circuit 28. One output of this circuit 28 is connected to an input of a management unit 29 of micro-controller type. One terminal of this management unit 29 is connected to the terminal 27 of the switch 25.

The common terminal 26 of the switch 25 is connected to the input of a RF transmitter 30 operating by frequency modulation (FM). The output of the transmitter 30 is connected to an antenna 31.

The position of the switch 25 is controlled by the management unit 29 via a link L' connected to an output of this unit 29.

The operation is as follows:

The system is designed to provide an oscillator between the identification device C1 mounted in the vehicle and the badge B1 and to create the so-called "Larsen" effect.

An oscillator is by principle a feedback system which displays a phase condition of 0° at a certain frequency, with a gain of a few dB. When a person approaches the vehicle equipped with the system S1, this system is "awakened" by a control signal. This signal can be emitted in various ways: for example, when the person operates the door handle, a micro-switch associated with said handle moves to a position that makes the electrical power supply of the system S1; or the user could press a button on a remote control unit to send a control signal that is detected by the antenna 19 of the system S1 of the vehicle; the control signal can be also emitted by inductive coupling when the user carrying his badge B1 approaches the vehicle.

When the system S1 is "awakened", the management unit 20 activates the oscillator 10 so that it emits a coded identification signal to the badge B1. For the emission of this identification signal, the switch 12 is in its position shown by a dotted line in FIG. 1. After the emission of this identification signal, the management unit 20 switches the switch 12 to its position shown by a solid line in FIG. 1, by means of the electric link L.

When the badge B1 receives the low frequency identification signal from the system S1, the switch 25 is in its position represented shown by a dotted line in FIG. 1. The coded identification signal is then received by the decoding circuit 28 which compares the identification code of the vehicle with that of the badge B1. If the codes match, the management unit 29 moves the switch 25, by means of the electric link L', to its position shown by a solid line in FIG. 1. Simultaneously, the transmitter 30 of the badge B1 emits one RF pulse (or more than one) of a duration of about 300 to 400 gs, that is received by the antenna 19 of the system S1. The pulse emitted by the transmitter 30 is used to initialize the counter of the management unit 20. If there are several different authorized badges for the same vehicle and these badges all send the initialization pulse at the same time, the system can be designed such that the transmitter 30 of each badge emits a second pulse, with a different time delay for each badge, enabling the management unit 20 of the system S1 to identify the different badges and assign an order of priority to them, in order to create the Larsen effect with a only one of the badges. If the Larsen effect were to be produced with several badges simultaneously there would be a risk of interference, notably radiofrequency beating, which would prevent recognition of the resonance frequency. For example, the badge of the driver of the vehicle may authorize him to control all its functions, whereas the badge of a passenger may not authorize starting of the engine. Another badge could be provided to give access to the vehicle but not the trunk (given for example to a garage mechanic who needs to work on the vehicle).

During emission of the RF pulse by the transmitter 30, the two switches 12 and 25 are in their position shown by a solid line in FIG. 1, such that a momentary loopback of the LF transmitting circuit (125 kHz) of the vehicle to the badge B1 is performed by the return circuit (radio frequency or high frequency) of the badge B1 to the vehicle. The feedback causes in the device C1 an oscillation whose resonance frequency is measured by the management unit 20 and is compared, by this management unit, with a reference value. This reference value can be initially memorized by means of a memory in the management unit 20, and be therefore learned by the system, when the badge B1 is situated at a distance from the device C1 less than a predetermined limit. The reference resonance frequency is memorized in the management unit, for each authorized badge, at the time of first use, generally before the sale of the vehicle.

If a parasitic system is interposed in the feedback loop formed in this manner, with the intention of repeating and thereby enabling a loop to be established even though the badge B1 is at a distance from the device C1 exceeding the predetermined limit, the phase and therefore the resonance frequency will necessarily change.

By comparing this modified resonance frequency with the reference frequency, the management unit 20 can detect the presence of the parasitic system and maintain the access interdiction.

If, on the other hand, the frequency condition is satisfied, the management unit 20 then pursues the identification procedure and moves the switch 12 from the solid line position of FIG. 1 to the dotted position to connect terminals 11 and 13.

In the badge B1, the management unit 29 moves the switch 25 from the solid line position to the dotted position to connect terminals 26 and 27 and interrupt the feedback loop.

The device C1 could use a communication frequency of 125 kHz to transmit to the badge B1, the transmitting and receiving antennas being tuned to this frequency, which obliges the system to oscillate around this frequency if the return channel is assumed to be linear and without phase shifting at this frequency.

The return channel 30, 31, 19, 18 operates at radiofrequency, for example at 434 MHz, or at another frequency. Frequency modulation appears to be the most suitable, and is used to achieve the best linearity possible.

The duration of the Larsen loopback can be of the order of 4 ms.

This arrangement can of course apply to any frequency, the value given previously being only as a non-limitative example.

Figure 2:
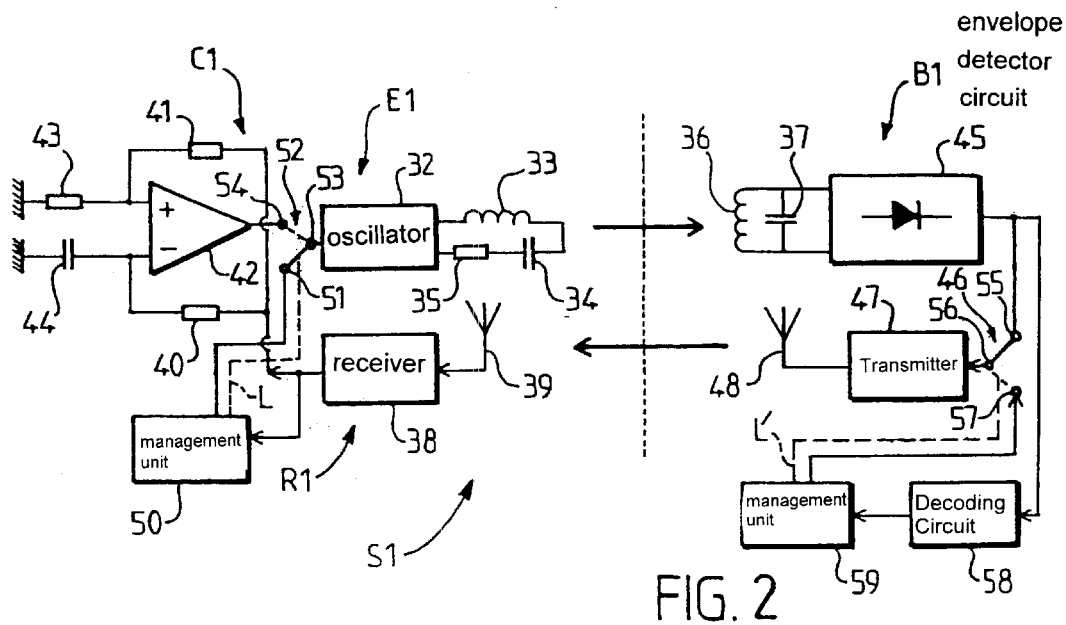
FIG. 2 is a block diagram of a variant of embodiment of the system according to the invention.

FIG. 2 illustrates a variant that is a simpler embodiment of the system S1 according to the invention. Again we find the identification device C1 installed in the vehicle with its transmitting circuit E1 and its receiving circuit R1. On the user side we find the identifier or badge B1.

According to this variant, as in the previous case, an oscillator is constructed between the LF link and the RF link, which enables a possible violation by a pirate transmission-reception system to be detected by detecting a variation of the oscillation frequency of the feedback system.

The transmitting circuit E1 includes a low frequency oscillator 32, for example at 125 kHz, whose output is connected to an inductance 33 connected in series with a capacitor 34 and a resistor 35, connected to another terminal of the oscillator 32. The inductance 33 provides for a coupling with another inductance 36 on the badge B1, connected in parallel with a capacitor 37.

The circuit R1 includes a RF receiver 38 of which one input is connected to an antenna 39. The output of the receiver 38 is connected by two resistors 40, 41 in parallel that are connected respectively to the inverter input and the non-inverter input of an operational amplifier 42. The output of the receiver 38 is also connected to the input of a management unit 50. The output of the management unit 50 is connected to a terminal 51 of a two-way switch 52 that has a common terminal 53 connected to the input of the oscillator 32. The other terminal 54 of the switch 52 is connected to the output of the operational amplifier 42 that feeds the oscillator 32. The non-inverter input of the amplifier 42 is connected to ground via a resistor 43, whereas the inverter input of the amplifier 42 is connected to ground via a capacitor 44. The management unit 50 controls the position of the switch 52 via a link L shown as a dashed line.

In the badge B1, the inductance 36 and the capacitor 37 are connected in parallel to the two input terminals of an envelope detector circuit 45. The output of the circuit 45 is connected to a terminal 55 of a two-way switch 46 that has a common terminal 56 and another terminal 57. This switch 46 can take two positions, a first position shown as a solid line in FIG. 2, in which terminal 56 is connected to terminal 55, and a second position shown as a dotted line in which terminal 56 is connected to terminal 57.

The output of the circuit 45 is also connected to an input of a data decoding circuit 58. One output of this circuit 58 is connected to an input of a micro-controller-type management unit 59. One terminal of this management unit 59 is connected to the terminal 57 of the switch 46.

The common terminal 56 of switch 46 is connected to the input of a RF transmitter 47 whose output is connected to an antenna 48. The position of the switch 46 is controlled by the management unit 59, via a link L' connected to an output of this unit 59.

The structure of the system in FIG. 2 is that of an oscillator where the feedback is assured by the transmission-reception assembly. The simplification, compared with the previous embodiment, is that the signals transmitted and received are of logical "all or nothing" type, which enables operation in "on/off" amplitude modulation.

The operation is as follows:

When the device C1 submits an identification request, the management unit 50 switches the switch 52 to its solid line position and the badge B1 receives said identification request. The management unit 59 of the badge B1, after correct identification of the code, switches the switch 46 to its solid line position, to close the transmission-reception loop.

The signals emitted by the transmitter E1 are analyzed by the envelope detector circuit 45 of the badge B1 which outputs modulation signals of the transmitter 47. The signals emitted by the transmitter 47 and the antenna 48 are picked up by the antenna 39 and the receiver 38.

The whole transmission-reception loop has a transit time which, associated with the time constant RC, where R and C are the respective values of the resistor and the capacitor connected to the inverter input of the operational amplifier, results in an oscillation at a specific frequency.

The management unit 50 of the circuit C1 measures this oscillation frequency and compares it with a determined value, as in the case of FIG. 1.

If relay transmitters are interposed in the feedback loop formed by the device C1 and the badge B1, the transit time in the loop will increase, lowering the oscillation frequency in proportion to the parasitic time delay introduced.

As in the case of FIG. 1, by measuring the oscillation frequency of the system and using it as a reference at each interrogation of the identifier B1, by comparison with a predetermined value, the presence of a relay transmitter-receiver acting as a repeater can be detected and access can be forbidden.

To exit this oscillatory mode, the feedback loop must be opened at the device C1 or at the badge B1. In the example shown in FIG. 2, this can be assured by the switch 46 whose opening breaks the link between the output of the envelope detector 45 and the modulation control of the RF transmitter 30, or by the switch 52 whose opening breaks the link between the output of the receiver 38 and the input of the oscillator 32. In both cases, the opening stops the oscillation.

In both the embodiments described, the system proposed enables a bi-directional radiofrequency transmission to be made secure by detecting the presence of relay transmitters serving as repeaters between the identification circuit C1 and the badge B1, thanks to the variation of the oscillation frequency of the feedback system. Access to the vehicle or to the enclosed space can then be forbidden when such relay transmitters are detected.

What is claimed is:

1. A system providing for enhanced security of a bi-directional data transmission controlling access to an enclosed space, including an identification device with a transmitting circuit and a receiving circuit installed in said enclosed space, and an identifier carried by a user wishing to gain access, a data interchange between said identification device and said identifier normally being established when the distance between them is less than a predetermined limit, the access being granted only when said identification device has authenticated said identifier, wherein, to prevent an interchange of identification data at a distance greater than said predetermined limit, the system includes means of switching that establish a momentary loopback of said transmitting circuit of said identification device, via a return circuit of said identifier, said loopback generating an oscillation having a resonance frequency and said identification device includes means of measuring the resonance frequency of the oscillation generated by such a loopback, and means of control able to measure the difference between said resonance frequency and a reference frequency, so as to maintain access interdiction when this difference exceeds a predetermined value.

2. A system according to claim 1, wherein said means of switching establish said monetary loopback of said transmitting circuit of said identification device during a request for identification, via said return circuit of said identifier, after an identification request has been authenticated by said identifier.

3. A system according to claim 1, wherein said identification device includes a receiving circuit with a radio frequency receiver and an identification management unit with a frequency counter, and a transmitting circuit with a low frequency generator, an amplifier, and a switch able to connect the output of the radio frequency receiver directly to the input of the amplifier, in order to establish said loopback, whereas in normal operation the input of said amplifier is connected to the output of said low frequency generator.

4. A system according to claim 3, wherein said identifier includes a low frequency receiver, a data decoding circuit, an identifier management unit, a radio frequency transmitter, and a switch able to connect the output of said low frequency receiver directly to the input of said radio frequency transmitter, in order to establish said loopback, whereas in normal operation the input of said radio frequency transmitter is connected to said identifier management unit.

5. A system according to claim 4, wherein said monetary loopback is triggered by the emission of an initialization signal by said radio frequency transmitter of said identifier, the initialization signal initializing said frequency counter of said identification management unit of said identification device.

6. A system according to claim 1, wherein said reference frequency with which said measured resonance frequency is compared comprises a value initially memorized, which is learned by the system.

7. A system according to claim 1, wherein the return signal is frequency modulated.

8. A system according to claim 1, wherein the operation makes use of transmitted and received signals of logical "all or nothing" type, and of "on/off" amplitude modulation.

9. A system according to claim 8, wherein said identification device includes an oscillator having an output that is connected to a transmitting circuit and having an input that is connected to a switch able to connect the output of a radio frequency receiver directly to the input of said oscillator, in order to establish the loopback, whereas in normal operation the input of said oscillator is connected to an output of an operational amplifier having a non-inverter input that is connected to ground via a resistor and having an inverter input that is connected to ground via a capacitor, each of said two inputs being connected via a resistor to the output of said radio frequency receiver.

10. A system according to claim 9, wherein said identifier includes an envelope detector circuit having an input that is connected to a low frequency receiving circuit and having an output that is connected to a data decoding circuit and an identifier management unit and also to a switch able to connect an output of said envelope detector circuit directly to an input of a radio frequency transmitter, in order to establish the loopback, whereas in normal operation the input of the radio frequency transmitter is connected to said identifier management unit.

11. A system according to claim 10, wherein of said transmission-reception loop has a transit time, associated with the time constant RC, where R and C are the respective values of said resistor and said capacitor both connected to the inverter input of said operational amplifier, that results in an oscillation at a specific frequency.

* * * * *